E. M. CHAPIN.
Sewer-Cleaning Device.
No. 202,519. Patented April 16, 1878.
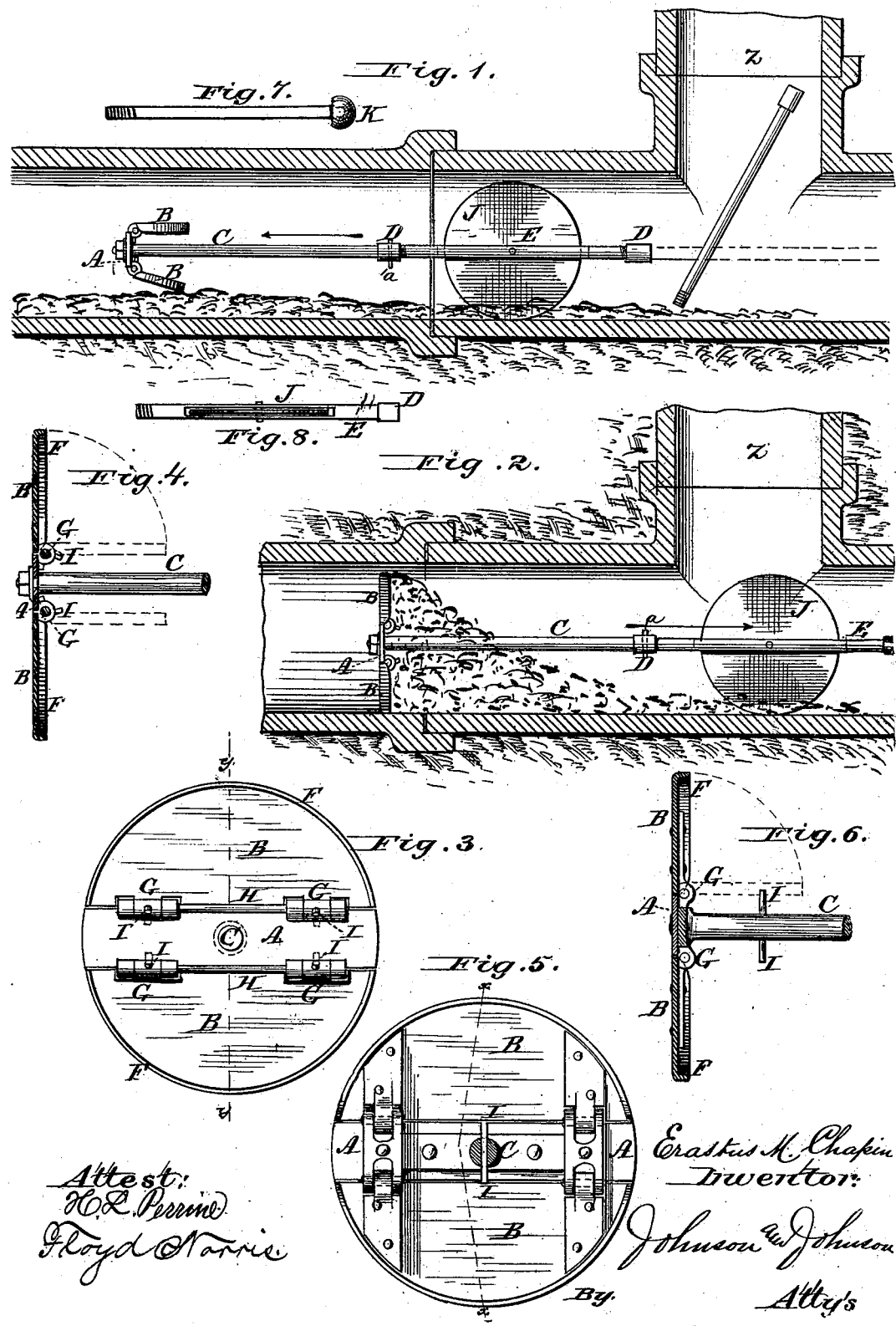

UNITED STATES PATENT OFFICE.

ERASTUS M. CHAPIN, OF WASHINGTON, DISTRICT OF COLUMBIA.

IMPROVEMENT IN SEWER-CLEANING DEVICES.

Specification forming part of Letters Patent No. 202,519, dated April 16, 1878; application filed February 25, 1878.

*To all whom it may concern:*

Be it known that I, ERASTUS M. CHAPIN, of Washington, in the District of Columbia, have invented certain new and useful Improvements in Sewer-Cleaning Devices; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My improvements relate to that class of pipe and other sewer-cleaning hoes in which a stiff handle of coupled sections is used with a hoe of hinged sections, inserted into the sewer to draw the débris therein to the man-hole for removal.

My improved hoe is formed of three sections, to the middle one of which the stiff handle is secured, and the hoe-sections are held open a distance equal to the width of the middle section, when inserting the hoe into the sewer, by stops on the hoe-section or by pins on the hoe-handle. The hoe-sections are opened at right angles to the handle as they gather the filth; and as the edges of the hoe-sections would be liable, in being drawn forward to catch into the pipe-joints, which are open to greater or less extent, I avoid this difficulty by forming the hoe-sections with flat bearing or return rims, so as to form flat bearing-surfaces, which readily pass the open joints and prevent the hoe catching therein as it is drawn toward the man-hole with the filth.

To assist in manipulating the hoe, and especially in inserting it into the sewer, I arrange a fulcrum-wheel or runner upon an axis-pin in the stiff handle a sufficient distance back of the hoe to allow it to be raised upon said fulcrum, to more readily be passed over stones, &c., and to be more easily inserted, and that the handle may be supported as its length is increased. This fulcrum-wheel must stand at right angles to the line of the hinges of the hoe-sections, to allow of the proper operating of the hoe, and it should be thin-edged, the better to cut its way through the débris.

Referring to the drawings, Figure 1 represents a vertical sectional view of a portion of a street-sewer where it joins a man-hole, showing the manner of using my improved stiff-handled sewer-cleaning hoe, the sections of which are folded as when the hoe is pushed into the sewer; Fig. 2, a view of the hoe with its hoe-sections extended as when cleaning the sewer; Fig. 3, the inner side view of the hoe-sections extended; Fig. 4, a section thereof; Fig. 5, a similar view to Fig. 3, showing a modification of the hinges and stops; Fig. 6, a section of Fig. 5; Fig. 7, the rearmost section of the stiff handle, showing the riding knob to prevent catching in pushing the handle back; and Fig. 8, an edge view of the thin fulcrum-wheel and the pipe-section in which it has its axis.

I use a simple hand-hinged hoe, managed by a workman, who, standing in the man-hole, thrusts the hoe far back into the sewer by successive movements, which he is enabled to make by a stiff handle composed of sections and couplings, which handle he forms of such length as the distance he may desire to extend the hoe into the sewer by coupling section after section.

The hoe is made of three sections, of sheet-steel about three-sixteenths of an inch thick, the middle section A whereof forms a diameter-strip, to which the hoe-sections B B proper are hinged, and to which a short handle, C, is permanently secured at the center. This handle is about three feet long, of one-inch galvanized pipe, and is provided with a screw-sleeve coupling, D, by which a similar length of pipe-section, E, is united to it. Each section of pipe is provided with such a screw-sleeve coupling, by which to unite any number of pipe-sections to form a rigid handle of the desired length. The union of these sections, it will be seen, is effected within the sewer, and in the line thereof; and as each pipe-section is coupled the hoe is pushed farther into the sewer from the man-hole Z. When a sufficient length of stiff handle has been thus applied to the hoe it is then drawn forward, gathering and bringing the mud and filth to the man-hole, the long stiff handle being meanwhile pushed back into the sewer on the other side of the man-hole.

In extending the hoe into the sewer its hinged sections are folded, so as to pass readily over the collected stuff; and in drawing the hoe out one or both its hinged sections are opened by the resistance of the mud, &c., in a plane with the middle section, and held so by the solid matter against which it is drawn filling the surface of the hoe.

The edges of the hoes are turned inward a suitable distance to form broad bearings F, to pass over the pipe-joints, which, in all pipe-sewers, are more or less open, and into which the edge of the hoe would be liable to catch in passing over them were it not for these bearing-rims.

The hinges G are formed by eyes upset from the hoe-sections and integral therewith, through which bolts H pass, and are secured on the inside faces of the sections, as shown in Figs. 3 and 4; or they may be made of separate knuckle-irons, riveted to the sections, as shown in the modification, Figs. 5 and 6.

Stops I are secured in the knuckles of the hoe, or upon the hoe-handle, to act upon the handle-strip or upon stops in the handle-section, and limit the inward closing of the hoes, so that they shall not rest upon the handle, but stand open a little distance from the handle, the better to catch into the sewer-débris, and to open in drawing the hoe forward, as shown in Figs. 4 and 6.

For a sewer of twelve or fifteen inches in diameter a nine-inch hoe would be used, and a hoe twelve inches would answer for a sewer from eighteen to twenty inches in diameter.

When the hinged sections are open, their hinged edges form the stops against the middle section.

To render the hoe easier to manipulate and manage in the sewer, I arrange, preferably in the second handle-section E, as shown in Fig. 1, a fulcrum support or wheel, J, standing at right angles to the line of the hoe-hinges, and about an eighth of an inch thick, so that, passing over or rolling upon the bottom of the sewer, it will cut its way through the débris, and allow the hoe to be raised to pass more easily over the mud, &c., by depressing the rear end of the handle, thus lessening the work.

To prevent the wheel-section P from turning on the section C, the coupling D is locked by a key or pin, a. (Shown in Fig. 1.)

The fulcrum-wheel may be fitted in a slot in the pipe-section, or upon bearings at the side or sides thereof, as may be preferred, and it is about six or eight inches in diameter for a twelve-inch sewer, so as to allow room for said wheel to rise over a brick or other obstruction.

In pushing the hoe-handle back into the sewer crossing the man-hole, as the hoe is drawn forward the rearmost end of the stiff handle would be liable to catch into the mud or upon the bottom of the sewer; and this I avoid by providing the last handle-section with a knob or spherical termination, K, Fig. 7, so as to ride over the débris more easily.

The work can be carried on throughout the sewer, without taking apart the handle-sections, by simply removing the hoe-section C, and pushing back the stiff handle from one man-hole to the other, and again attaching the hoe-section at the next man-hole, and so on throughout the line of the sewer. In such case, however, the handle must be of a greater length than is required for working both ways from a man-hole.

A thin rolling fulcrum-support for the handle is preferred; but it is obvious that such fulcrum-point may be a thin runner fixed to and projecting from the handle like a curved blade or sled-runner.

It will be seen that the fulcrum-wheel J bears such relation to the hinged hoes B B that either of the latter can be used as the scraper, and that, in pushing the hoe into the sewer, the lower hinged section passes over the débris without pressure, and free from the weight of the carrying-rod, while in drawing the hoe forward the fulcrum-wheel gives the advantage of keeping the hoe down to its work on the bottom of the sewer, or of lifting the hoe, if necessary, to free it from any catching or obstruction.

I claim—

1. A sewer-cleaning hoe consisting of the three sections, hinged together, the middle section A carrying a stiff handle formed of coupled sections.

2. A sewer-cleaning hoe having hinged sections with bearing-rims, for the purpose stated.

3. In a sewer-cleaning hoe consisting of the hinged sections B B and a middle handle-section, A, the pin-stops I, arranged as described, and for the purpose stated.

4. The combination, with a sewer-cleaning hoe, constructed substantially as hereinbefore set forth, of a fulcrum-wheel or runner.

5. A sewer-cleaning hoe consisting of the hinged hoe-sections provided with bearing-rims, a stiff operating-handle of coupled sections, a fulcrum-wheel, and a spherical rearmost termination on said stiff handle, for operating within a sewer, as stated.

In testimony that I claim the foregoing I have affixed my signature in the presence of two witnesses.

ERASTUS M. CHAPIN.

Witnesses:
A. E. H. JOHNSON,
J. W. HAMILTON JOHNSON.